United States Patent [19]

Antal

[11] Patent Number: 4,722,651

[45] Date of Patent: Feb. 2, 1988

[54] HYDRAULIC BUMPER LIFT DEVICE FOR A PICKUP TRUCK

[76] Inventor: Dean L. Antal, Box 1347, Cardston, Alberta, Canada, T0K 0K0

[21] Appl. No.: 66,065

[22] Filed: Jun. 24, 1987

[30] Foreign Application Priority Data

Dec. 17, 1986 [CA] Canada .................................. 525566

[51] Int. Cl.⁴ ........................................... A01D 87/12
[52] U.S. Cl. .................... 414/24.5; 293/117; 414/24.6; 414/555; 414/558
[58] Field of Search .................... 414/24.5, 24.6, 555, 414/558, 684, 911; 293/116, 117

[56] References Cited

U.S. PATENT DOCUMENTS

| | | | |
|---|---|---|---|
| 4,008,862 | 2/1977 | Wilmes | 414/24.6 |
| 4,090,624 | 5/1978 | Krein et al. | 414/24.6 |
| 4,159,833 | 7/1979 | Meiners | 293/117 X |
| 4,298,301 | 11/1981 | Carter et al. | 414/24.6 |
| 4,412,768 | 11/1983 | Bauer et al. | 414/24.5 |
| 4,538,948 | 9/1985 | Melton | 414/24.6 |
| 4,564,325 | 1/1986 | Ackerman | 414/24.5 |
| 4,579,497 | 4/1986 | Nine | 414/24.5 |
| 4,674,933 | 6/1987 | Brown | 414/24.6 |

Primary Examiner—Leslie J. Paperner
Attorney, Agent, or Firm—Adrian D. Battison; Stanley G. Ade; Murray Thrift

[57] ABSTRACT

A device for attachment to the rear of a pickup truck as a replacement for the rear bumper includes a transverse frame member which is pivotally mounted on brackets carried on the chassis. The frame member carries a pair of arms each of which is pivoted at an outer end of the frame member and extends across the frame member in a folded position with an outer stub portion extending outwardly and around the end of the frame member to define ends of the bumper. Hydraulic rams can pivot the frame member about a horizontal axis and can pivot the arms about vertical axes at the outer ends of the frame member. Flanges extending from the rear face of the frame member confine and receive the arms and define a compartment for a hitch pin.

20 Claims, 5 Drawing Figures

HYDRAULIC BUMPER LIFT DEVICE FOR A PICKUP TRUCK

BACKGROUND OF THE INVENTION

This invention relates to a device for attachment to a pickup truck as a replacement for the rear bumper thereof which includes arms for lifting a round bale for loading and unloading relative to the truck bed.

Devices have previously been proposed for mounting at the rear of a pickup truck for loading and unloading round bales for transportation and livestock feeding purposes.

Some of the designs have achieved some success and products have been sold of this general type. However, in many cases these devices require significant modification to the truck including in some cases the total replacement of the truck bed and thus they are expensive to manufacture and install and in addition they can limit the truck with regard to its end uses so that it is restricted from properly carrying out other functions.

It will be appreciated that most farmers wish to use their vehicle for as many purposes as possible and hence it is very desirable that the lifting device, when retracted, does not interfere with any other use of the vehicle in normal manner.

It is one object of the present invention, therefore, to provide a device which can be attached to a pickup truck or similar vehicle in replacement for the rear bumper with the device being arranged to load and unload bales from the pickup box in an operating condition thereof and the device also being retractable and foldable so that it does not interfere with the positioning of other loads on the box.

According to a first aspect of the invention, therefore, there is provided a vehicle comprising a chassis having a pair of spaced parallel chassis members and ground wheels for supporting the chassis for movement across the ground, a truck bed mounted on the chassis for receiving and supporting a load and a bale lifting device for lifting a bale onto the truck bed, the bale lifting device comprising a pair of brackets each mounted on a respective chassis member so as to extend rearwardly therefrom separate from said truck bed, a transverse frame member extending transversely of said vehicle from one side to the other thereof at a rear end of said vehicle, pivot means mounting said frame member on said brackets for pivotal movement of said frame member about a horizontal axis transverse to the vehicle, hydraulic ram means having bracket means attaching one end thereof to said chassis and an opposed end to said frame member so as to actuate said pivotal movement, a pair of arm members each having one end thereof mounted at a respective end of the frame member for pivotal movement about an axis at right angles to said frame member from a first position in which said arm members lie along said frame member parallel thereto to a second position in which said arm members extend outwardly from said frame member generally at right angles thereto, each of said arm members having a spike extending generally at right angles thereto and mounted thereon at an end thereof remote from said frame member in said second position such that spikes in said second position extend toward one another for engaging a bale, said frame member being shaped, including a pair of openings therein, to receive and confine said arm members and spikes in said first position such that said frame members and arm members define a rear bumper for said vehicle.

According to a second aspect of the invention, therefore, there is provided a bale lifting device for use on a vehicle comprising a chassis having a pair of spaced parallel chassis members and ground wheels for supporting the chassis for movement across the ground and a truck bed mounted on the chassis for receiving and supporting a load, said bale lifting device comprising a pair of brackets each for mounting on a respective chassis member so as to extend rearwardly therefrom separate from said truck bed, a transverse frame member arranged in use to extend transversely of said vehicle from one side to the other thereof at a rear end of said vehicle, pivot means mounting said frame member on said brackets for pivotal movement of said frame member about a horizontal axis transverse to the vehicle, hydraulic ram means having bracket means for attaching one end thereof to said chassis and attached at an opposed end to said frame member so as to actuate said pivotal movement, a pair of arm members each having one end thereof mounted at a respective end of the frame member for pivotal movement about an axis at right angles to said frame member from a first position in which said arm members lie along said frame member parallel thereto to a second position in which said arm members extend outwardly from said frame member generally at right angles thereto, each of said arm members having a spike extending generally at right angles thereto and mounted thereon at an end thereof remote from said frame member in said second position such that spikes in said second position extend toward one another for engaging a bale, said frame member being shaped, including a pair of openings therein, to receive and confine said arm members and spikes in said first position such that said frame members and arm members define a rear bumper for said vehicle.

The device therefore can be attached to the chassis of a pickup truck simply by removal of the existing bumper mechanism and attachment of the device to the chassis without in any way interfering with the pickup box so that the device extends rearwardly from the pickup box in the position of the normal rear bumper.

The whole of the frame member thus can pivot around the horizontal axis and is shaped to receive and confine the arms in the folded condition thereof so that the frame member and the arm constitute the rear bumper in that folded condition.

Preferably each of the arms includes a stub portion which extends outwardly and forwardly from the arm in the folded condition so that it wraps around the end of the frame member and constitutes an end of the bumper defined by the frame member and the arms. That stub portion can then be engaged by a hydraulic ram which extends generally parallel to a forward face of the frame member so that the hydraulic rams are protectedly received adjacent the frame member and are normally concealed from a rear view and protected from engagement by obstacles in the folded condition.

The frame member is preferably defined by a substantially flat plate member which extends across the rear face of the vehicle and includes flanges extending rearwardly from that plate member across the plate member at right angles thereto so as to define a channel for confining said arms in the folded condition. Flanges extending forwardly from the plate member can then contact the various parts of the pivot mounting, arm rams and pivot ram for the actuation movement of the arms and the frame member.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
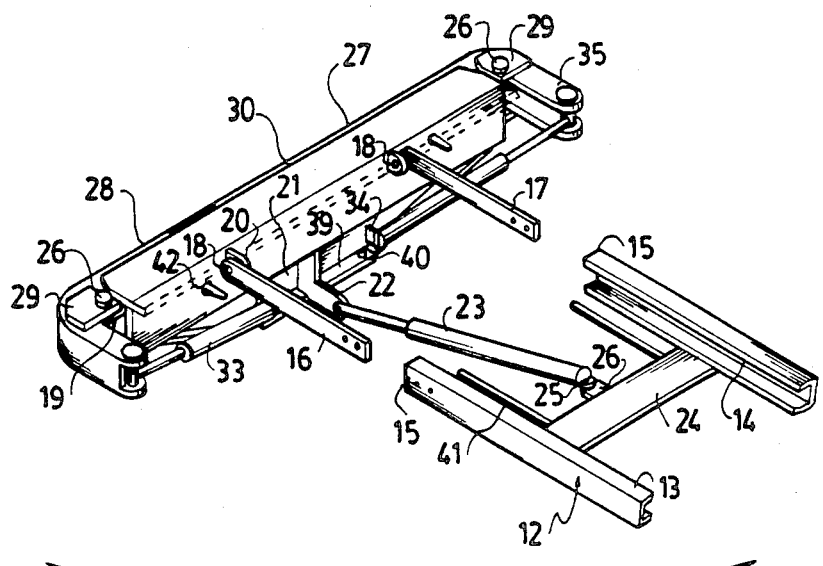
FIG. 1 is an isometric view showing one embodiment of the invention with the truck box and wheels omitted for convenience of illustration.
Figure 3:
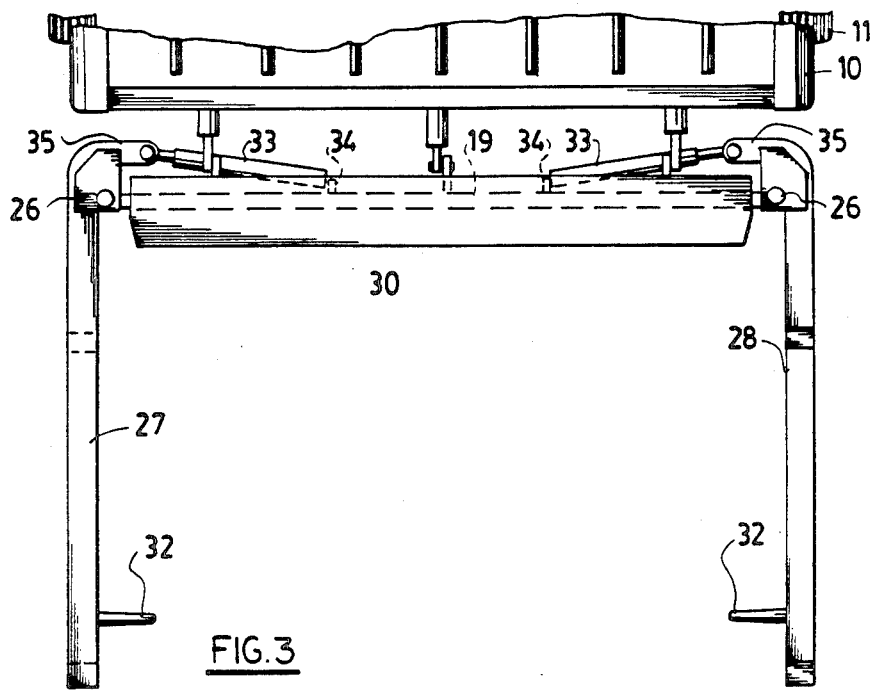
FIG. 3 is a top plan view similar to FIG. 2 including the box of the truck shown schematically and with the arms in an opened condition.

A vehicle shown only schematically in FIGS. 1 and 3 comprises a truck box 10 and ground wheels 11 mounted upon a chassis 12 including a pair of spaced parallel chassis members 13 and 14. The members have rear ends 15 which normally receive a bumper mount of conventional construction.

With the bumper mount removed, the embodiment according to the invention can be attached for replacement of a conventional bumper and for providing the hydraulically actuated lift as will be described in detail hereinafter.

The device comprises a pair of brackets 16 and 17 which are in the form of plates which can be bolted alongside the frames 13 and 14 so as to extend rearwardly therefrom beyond the normal end 15. At a rear end of the plate brackets 16 and 17 is mounted a pivot coupling 18.

On the pivot couplings 18 is mounted a transverse beam 19 which carries a pair of flanges 20 which extend outwardly from the rear of the beam for attachment to the pivot couplings 18 so that the beam 19 can pivot about a horizontal axis defined by the couplings 18.

A plate 21 extends downwardly from the rear face of the beam 19 and carries a strut 22 which extends outwardly therefrom and forwardly therefrom toward the chassis for engagement with the outer end of a hydraulic ram 23. The inner end of the ram is mounted upon a bracket 24 which includes a strut 25 and pivot coupling 26 so that retraction and extension of the ram under hydraulic pressure (from a supply not shown) acts to pivot the beam about the horizontal axis.

Figure 2:
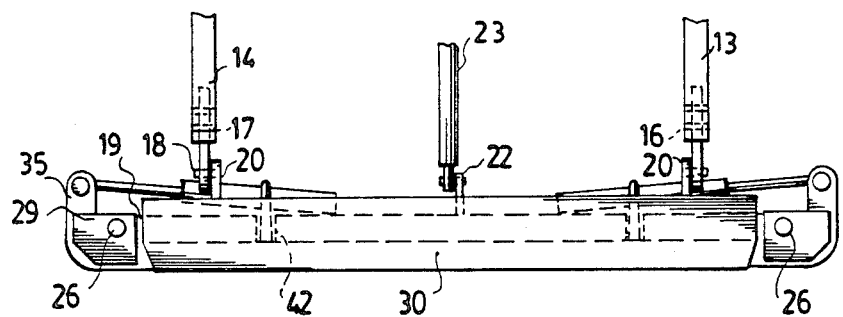
FIG. 2 is a top plan view of the embodiment of FIG. 1 showing the arms in a folded condition.

Each end of the beam 19 carries a pivot pin 26 which in the position shown in FIGS. 1 and 2 is vertical. Each of the pivot pins 26 supports a respective arm 27 and 28 for pivotal movement about the axis defined by the pin. For this purpose each of the arms, which is formed as substantially a box section, includes a pair of flanges 29 which extend from the arm forwardly over the end of the beam to engage the pin.

Figure 4:
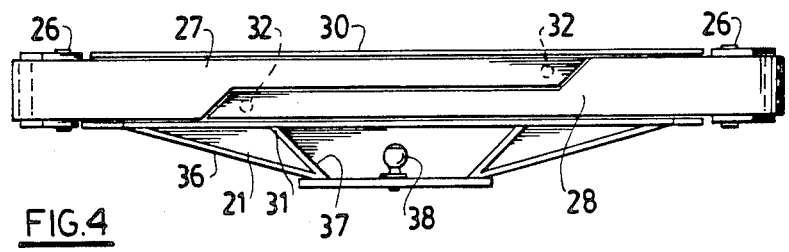
FIG. 4 is a rear elevational view of the embodiment of FIG. 1 in the folded condition.

As best shown in FIG. 4, the beam 19 includes a pair of flanges 30 and 31 which extend outwardly from the rear face of the beam across the beam and vertically spaced so as to define a channel for receiving the arms in a folded condition. The flange 30 forms part of an upper plate which extends also rearwardly of the upper face of the beam to define an upper face of the bumper extending to a position adjacent the truck bed. This is shown in dotted line in FIG. 1 for convenience of illustration. Outer portions of the arms at the respective pivot pins 26 have a width or height substantially equal to the height of the channel defined by the flanges 30 and 31. At the ends of the arms, the opposite arm is reduced in height so that the arms have portions of substantially half the height of the channels which intermesh in the centre section. In this way the channel is substantially filled by the arms but the arms can intermesh and have a length greater than twice the width of the beam. Each arm at its outermost end carries a spike 32 which faces inwardly as best shown in FIG. 3 in the opened condition of the arms.

Actuation of the arms so that they can move from the first position in which they are folded as shown in FIG. 4 to an open position as shown in FIG. 3 is caused by a pair of rams 33. Each of the rams has an inner end carried upon a flange 34 extending rearwardly from a plate defined by a rear face of the beam 19 and the plate 21 and extends therefrom generally parallel to the beam 19 to an outer end. Each of the arms has on the opposed side of the pin 26 a stub portion 35 which extends outwardly therefrom and curves around generally at right angles thereto for engaging the outer end of the respective ram. It will be noted that the outer surface of the arm at the curved end of the stub portion 35 forms an outer surface which wraps around the end of the beam and thus defines a side surface of a rear bumper for the vehicle.

The beam 19 and downward extending plate 21 have flanges 36 and 37 extending rearwardly therefrom and defining a compartment receiving a hitch pin 38 of conventional construction beneath the beam 19 and beneath the channel receiving the arms 27 and 28. As shown in FIG. 1, the plate 21 has a horizontal flange 39 extending forwardly therefrom toward the bracket 24 of the ram 23. The bracket 24 and the flange 39 include cooperating openings 40 for receiving tie rods 41 which can locate the beam 19 in its vertical position so that heavier loads can be attached to the hitch pin 38 without applying force to the ram 23.

The normal folded condition of the device is shown in FIGS. 1, 2 and 4, with the arms being moved by expansion of the rams 33 into the folded position, that is within the channel defined by the flanges 30 and 31. In this position, the spikes 32 project through openings 42 in the beam 19 so that they emerge on the forward side of the beam as shown in FIG. 1. In this position the arms are fully retained and protected within the confines of the transverse frame member defined by the beam and flanges and also the rams 33 are maintained on the forward surface of that frame member and are protected thereby from engagement with obstacles. In addition the rams cannot be seen in the rear view of FIG. 4 thus presenting a pleasing appearance of the device from the rear view.

In a first movement of the device, the rams 33 can be retracted to move the arms into an opened position as shown in FIG. 3. In this position the arms move directly outwardly to take a position extending rearwardly from the vehicle with the spikes projecting generally inwardly. In this position, the vehicle can be backed up to a bale with the spikes spaced by a distance greater than the length of the bale following which the rams can be operated to move the arms slightly inwardly so that the spikes enter the bale and grasp that bale for lifting.

Figure 5:
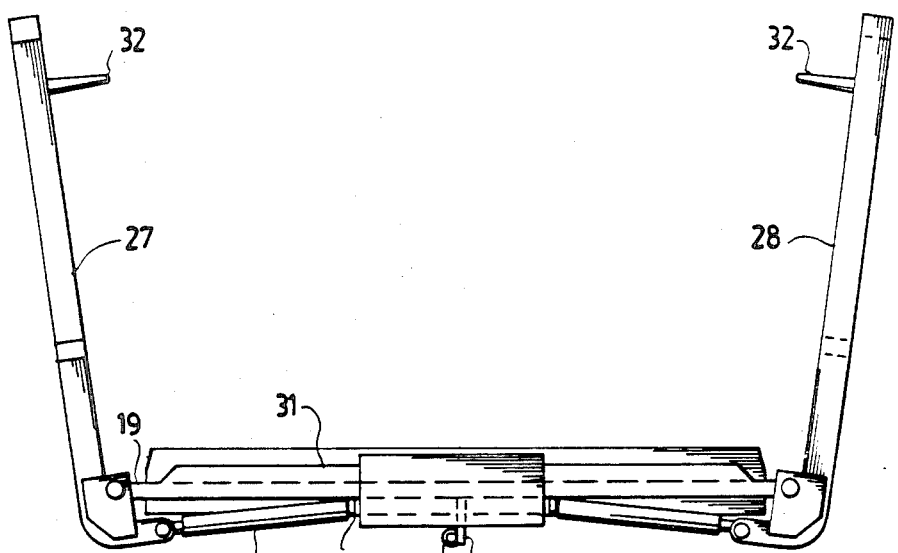
FIG. 5 is a rear elevational view similar to FIG. 4 showing the embodiment in the opened and pivoted position for loading a bale.

A lifting motion of the arms is obtained by actuating the ram 23 so that the whole of the rear frame member including the beam 19, plate 21 and the rearwardly extending flanges is pivoted about the pivot couplings 18 to take a position in which the arms are pressed inwardly against the bale and the bale is lifted upwardly above the truck box and slightly forwardly of the beam 19. In this position, the rams 33 can again be actuated to open the arms 27 and 28 into the position shown in FIG. 5 at which the bale is released from the spikes 32 for deposit onto the truck box. Preferably however only a single bale is carried and is maintained on the spikes during transport.

The beam can then be pivoted about the horizontal axis to return to the lowered position for unrolling of the bale across the ground and for folding of the arms into the retracted position.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A vehicle comprising a chassis having a pair of spaced parallel chassis members and ground wheels for supporting the chassis for movement across the ground, a truck bed mounted on the chassis for receiving and supporting a load and a bale lifting device for lifting a bale onto the truck bed, the bale lifting device comprising a pair of brackets each mounted on a respective chassis member so as to extend rearwardly therefrom separate from said truck bed, a transverse frame member extending transversely of said vehicle from one side to the other thereof at a rear end of said vehicle, pivot means mounting said frame member on said brackets for pivotal movement of said frame member about a horizontal axis transverse to the vehicle, hydraulic ram means having bracket means attaching one end thereof to said chassis and an opposed end to said frame member so as to actuate said pivotal movement, a pair of arm members each having one end thereof mounted at a respective end of the frame member for pivotal movement about an axis at right angles to said frame member from a first position in which said arm members lie along said frame member parallel thereto to a second position in which said arm members extend outwardly from said frame member generally at right angles thereto, each of said arm members having a spike extending generally at right angles thereto and mounted thereon at an end thereof remote from said frame member in said second position such that spikes in said second position extend toward one another for engaging a bale, said frame member being shaped, including a pair of openings therein, to receive and confine said arm members and spikes in said first position such that said frame members and arm members define a rear bumper for said vehicle.

2. The invention according to claim 1 including hydraulic ram means for actuating movement of said arms relative to said frame member, said rams extending generally parallel to said frame member and including means for attachment of one end of each of said rams to said frame member, each of said arms including a stub portion extending therefrom on a side of the respective pivot axis opposite to said arm, said stub portion including means for attachment to an opposed end of a respective one of said rams whereby retraction of said rams causes a movement of said arms from said first position to said second position.

3. The invention according to claim 2 wherein said stub portion extends from said pivot axis outwardly and forwardly relative to said arm so as to define an outer face of said arm which curves around said pivot axis and defines an end face of said rear bumper.

4. The invention according to claim 1 wherein said frame member comprises a plate member extending transversely to said vehicle, said plate member having a pair of flanges extending outwardly and rearwardly therefrom at right angles thereto and in parallel relationship so as to define a channel member for receiving said arms therein.

5. The invention according to claim 1 wherein the frame member supports a hitch pin beneath said arms and extending upwardly from a flange member extending outwardly from a rear face of said frame member.

6. The invention according to claim 1 wherein each of said arms includes a portion thereof of reduced height with the portion of one arm being arranged relative to the portion of the other arm so that they can lie alongside one another with the arms arranged substantially at the same height on the frame member.

7. The invention according to claim 1 wherein said frame member comprises a plate member extending transversely to said vehicle, said plate member having a pair of flanges extending outwardly and rearwardly therefrom at right angles thereto and in parallel relationship so as to define a channel member for receiving said arms therein, said openings being defined in said plate member between said flange members and offset such that one of said openings is positioned above the other of the openings and such that both of said openings are spaced outwardly of a centre line of said plate member.

8. The invention according to claim 1 wherein said frame member comprises a plate member extending transversely to said vehicle, said plate member having a pair of flanges extending outwardly and rearwardly therefrom at right angles thereto and in parallel relationship so as to define a channel member for receiving said arms therein, said plate member including a plurality of flanges extending outwardly from a face thereof opposed to said arms for attachment to said rams and said bracket members.

9. The invention according to claim 1 wherein said frame member includes a ram coupling strut extending outwardly from a face thereof opposed to said arms toward said chassis for attachment to said ram such that retraction of said ram draws said strut into a substantially horizontal position and extension of said ram forces said strut outwardly such that pivotal movement of said frame member about said horizontal axis causes said strut to move into a substantially vertical position after movement of said frame member substantially through 90°.

10. The invention according to claim 1 wherein said frame member includes a hitch pin supported thereon and wherein said frame member includes rigid tie bars for attachment between said frame member and said ram bracket means to hold said ram in a retracted position thereof.

11. A bale lifting device for use on a vehicle comprising a chassis having a pair of spaced parallel chassis members and ground wheels for supporting the chassis for movement across the ground and a truck bed mounted on the chassis for receiving and supporting a load, said bale lifting device comprising a pair of brackets each for mounting on a respective chassis member so as to extend rearwardly therefrom separate from said truck bed, a transverse frame member arranged in use to extend transversely of said vehicle from one side to the other thereof at a rear end of said vehicle, pivot means mounting said frame member on said brackets for pivotal movement of said frame member about a horizontal axis transverse to the vehicle, hydraulic ram means having bracket means for attaching one end thereof to said chassis and attached at an opposed end to said frame member so as to actuate said pivotal movement, a pair of arm members each having one end thereof mounted at a respective end of the frame member for pivotal movement about an axis at right angles to said frame member from a first position in which said arm members lie along said frame member parallel thereto to a second position in which said arm members extend outwardly from said frame member generally at right angles thereto, each of said arm members having a spike extending generally at right angles thereto and mounted thereon at an end thereof remote from said frame member in said second position such that spikes in said second position extend toward one another for engaging a bale, said frame member being shaped, including a pair of openings therein, to receive and confine said arm members and spikes in said first position such that said frame members and arm members define a rear bumper for said vehicle.

12. The invention according to claim 11 including hydraulic ram means for actuating movement of said arms relative to said frame member, said rams extending generally parallel to said frame member and including means for attachment of one end of each of said rams to said frame member, each of said arms including a stub portion extending therefrom on a side of the respective pivot axis opposite to said arm, said stub portion including means for attachment to an opposed end of a respective one of said rams whereby retraction of said rams causes a movement of said arms from said first position to said second position.

13. The invention according to claim 12 wherein said stub portion extends from said pivot axis outwardly and forwardly relative to said arm so as to define an outer face of said arm which curves around said pivot axis and defines an end face of said rear bumper.

14. The invention according to claim 11 wherein said frame member comprises a plate member extending transversely to said vehicle, said plate member having a pair of flanges extending outwardly and rearwardly therefrom at right angles thereto and in parallel relationship so as to define a channel member for receiving said arms therein.

15. The invention according to claim 11 wherein the frame member supports a hitch pin beneath said arms and extending upwardly from a flange member extending outwardly from a rear face of said frame member.

16. The invention according to claim 11 wherein each of said arms includes a portion thereof of reduced height with the portion of one arm being arranged relative to the portion of the other arm so that they can lie alongside one another with the arms arranged substantially at the same height on the frame member.

17. The invention according to claim 11 wherein said frame member comprises a plate member extending transversely to said vehicle, said plate member having a pair of flanges extending outwardly and rearwardly therefrom at right angles thereto and in parallel relationship so as to define a channel member for receiving said arms therein, said openings being defined in said plate member between said flange members and offset such that one of said openings is positioned above the other of the openings and such that both of said openings are spaced outwardly of a centre line of said plate member.

18. The invention according to claim 11 wherein said frame member comprises a plate member extending transversely to said vehicle, said plate member having a pair of flanges extending outwardly and rearwardly therefrom at right angles thereto and in parallel relationship so as to define a channel member for receiving said arms therein, said plate member including a plurality of flanges extending outwardly from a face thereof opposed to said arms for attachment to said rams and said bracket members.

19. The invention according to claim 11 wherein said frame member includes a ram coupling strut extending outwardly from a face thereof opposed to said arms toward said chassis for attachment to said ram such that retraction of said ram draws said strut into a substantially horizontal position and extension of said ram forces said strut outwardly such that pivotal movement of said frame member about said horizontal axis causes said strut to move into a substantially vertical position after movement of said frame member substantially through 90°.

20. The invention according to claim 11 wherein said frame member includes a hitch pin supported thereon and wherein said frame member includes rigid tie bars for attachment between said frame member and said ram bracket means to hold said ram in a retracted position thereof.

* * * * *